Jan. 21, 1941. B. L. WHITTIER Re. 21,700

DRIER FELT

Original Filed July 1, 1937

Inventor
B. L. Whittier,

By Ryan Dowell.
Attorneys

Reissued Jan. 21, 1941

Re. 21,700

UNITED STATES PATENT OFFICE 21,700

DRIER FELT

Benjamin L. Whittier, Ruxton, Md., assignor to Mt. Vernon-Woodberry Mills, Inc., Baltimore, Md., a corporation of Maryland Original No. 2,115,658, dated April 26, 1938, Serial No. 151,487, July 1, 1937. Application for reissue April 19, 1940, Serial No. 330,028

7 Claims. (Cl. 139—420)

Figure 1:
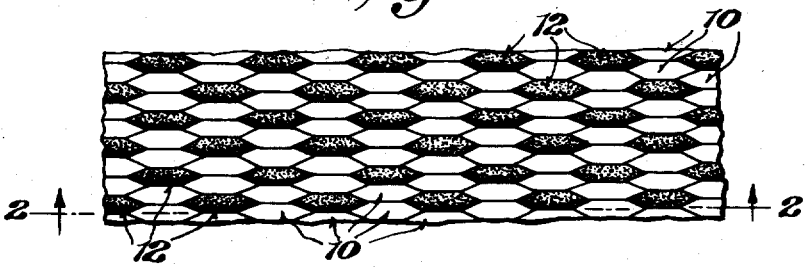

This invention relates to a fabric for use as a belting, webbing, or the like, acting as a conveyor or guide where a strong flexible fabric is required. This invention particularly relates to a belting, webbing, or the like, to be used in paper manufacturing plants, or the like, as a guide or conveyor belt, commonly known as a drier felt, for wet newly formed paper passing through the drier machines coming in contact with a series of heated drying drums.

Drier felts have been manufactured of woven multi-ply construction composed entirely of cotton or similar material. These felts have been found to be relatively short lived and not sufficiently durable when subjected to excessive heat.

In order to provide a drier felt of greater durability multi-ply fabrics with an asbestos surface or facing have been manufactured. Such asbestos faced fabrics have been woven to provide a solid asbestos paper supporting and engaging surface. This type of construction was found to be more durable, but likewise much heavier and more expensive.

In addition, these fabrics had several objectionable features caused by the natural characteristics inherent in asbestos which formed the solid facing, such as roughness, low tensile strength, excessive retention of moisture, chafing, and similar well known characteristics.

The present invention has for its object the overcoming of the above objectionable features and the provision of a drier felt possessing substantially the same advantageous characteristics of a multi-ply cotton fabric as to strength, weight, cost, surface finish, moisture retention and the like but of considerably improved durability.

The invention contemplates the provision of a drier felt of a three-ply or multi-ply construction mainly consisting of cotton but with an asbestos strand interspersed periodically between the cotton strands to withstand excessive heat and to form a binder for the cotton strands or fibers.

The invention will be hereinafter more particularly described with reference to the drawing forming a part hereof, and later pointed out in the claims at the end of the description.

Figure 2:
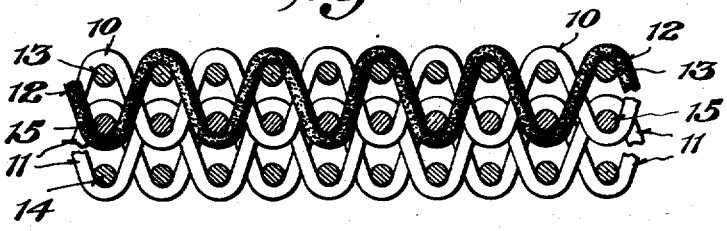

In the drawing:

Fig. 1 is a plan view on an enlarged scale of a drier felt illustrating one application of the invention;

Fig. 2, a longitudinal section on the line 2—2 of Fig. 1; and

Figure 3:
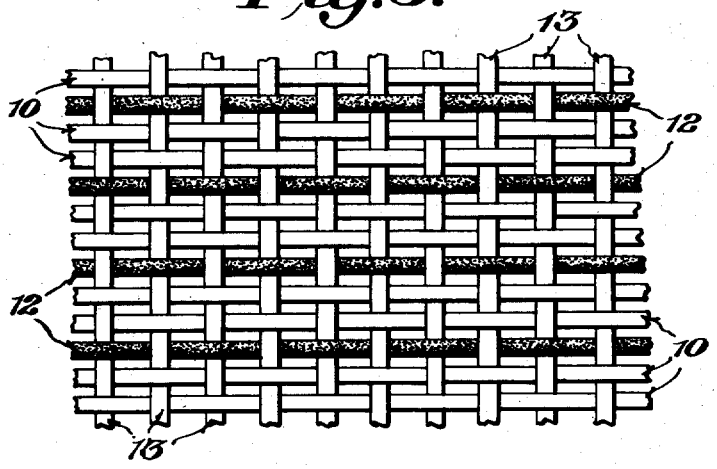

Fig. 3, an expanded plan view illustrating more in detail the construction of the top or surface layer of the fabric shown in Fig. 1.

Referring to the drawing in detail, the improved drier felt consists of a multi-ply fabric of woven construction which for the purpose of illustration is shown formed of three plies. This fabric includes upper warp threads or strands 10 and lower warp threads or strands 11 of cotton or like material with asbestos binder threads or strands 12 interwoven or interspersed between the threads or strands 10. The upper, lower and intermediate weft strands, or picks of the filling, indicated at 13, 14 and 15, respectively, are also preferably comprised of cotton or material having the characteristics of cotton. Practical experience has demonstrated that the relative number of asbestos strands shown in the drawing is highly satisfactory when the webbing or belt material is used as a drier felt. The warps are preferably each looped or passed about alternate wefts or picks of filling in each of two adjacent plies as illustrated.

It will be seen that this type of fabric construction provides a drier felt having substantially the same advantageous characteristics of a cotton felt, or a felt made up completely of strands of cotton or analogous material, and yet at the same time the felt has much greater durability than a cotton felt and its life will be substantially greater because of the inter-woven heat resisting asbestos yarns.

It will be understood that the construction and arrangement of the weave as well as the relative number of asbestos and cotton strands may be varied within certain limits. For example, a certain number of the weft strands could be of asbestos; the lower warp threads 11 could also have asbestos strands interspersed therebetween, and other minor changes adopted within the scope of the invention as defined by the appended claims.

I claim:

1. A three-ply woven drier felt comprising cotton filling, and warp threads each passed about alternate picks of filling in each of two adjacent plies, and every third warp thread in the surface ply being an asbestos thread with the remaining warp threads being of cotton.

2. A multi-ply woven drier felt comprising cotton filling, and warp threads each passed about alternate picks of filling in each of two adjacent plies, and at least two-thirds of the number of warp threads in the surface ply being of cotton and the remainder being principally of asbestos, the latter being uniformly distributed across the surface ply.

3. A multi-ply woven drier felt comprising filling having the characteristics of cotton, and warp threads each passed about alternate picks of filling in each of two adjacent plies, and at least two-thirds of the number of warp threads in the surface ply having the characteristics of cotton and the remainder being threads composed principally of asbestos, the latter being uniformly distributed across the surface ply.

4. A multi-ply woven drier felt comprising filling having the characteristics of cotton, and warp threads each passed about alternate picks of filling in each of two adjacent plies, and at least two-thirds of the number of warps in the surface ply having the characteristics of cotton and the remaining warps thereof being composed principally of asbestos, the latter being uniformly distributed across the surface ply, with the interweaving of the adjacent asbestos warps with the filling being staggered.

5. A three-ply woven drier felt comprising cotton filling, and warp threads each looped about alternate picks of filling in each of two adjacent plies, and every third warp in the surface ply being principally of asbestos and the remaining warps being of material having the characteristics of cotton.

6. A multi-ply woven drier felt comprising, a first set of threads extending in one direction, a second set of threads extending thereunder in the same direction, and a third set of threads extending crosswise of said first and second sets and interwoven with said first set and said second set to form a working surface layer for said felt that substantially conceals said first and second sets of threads, said third set including cotton threads and asbestos threads periodically and uniformly interspersed between said cotton threads throughout said working surface layer, a substantial proportion of the threads in said third set being asbestos threads.

7. A multi-ply woven drier felt comprising a first set of threads extending in one direction, a second set of threads extending thereunder in the same direction, a third set of threads extending under said second set in said direction, a fourth set of threads extending crosswise of said first and second sets and interwoven with said first set and said second set to form a top working surface layer for said felt that substantially conceals said first and second sets of threads, said fourth set including cotton threads and asbestos threads periodically and uniformly interspersed between said cotton threads throughout said working surface layer, and a fifth set of cotton threads extending crosswise of and interwoven with said second set and third set, a substantial proportion of the threads in said fourth set being asbestos threads.

BENJAMIN L. WHITTIER.